(12) United States Patent
Russell

(10) Patent No.: US 11,887,380 B1
(45) Date of Patent: Jan. 30, 2024

(54) SIDEWALK DETECTION FOR PEDESTRIAN BEHAVIOR MODELING

(71) Applicant: Waymo LLC, Mountain View, CA (US)

(72) Inventor: Jared Stephen Russell, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 139 days.

(21) Appl. No.: 17/144,209

(22) Filed: Jan. 8, 2021

Related U.S. Application Data

(63) Continuation of application No. 16/212,833, filed on Dec. 7, 2018, now Pat. No. 10,915,762.

(51) Int. Cl.
| | |
|---|---|
| *G06V 20/56* | (2022.01) |
| *G06T 7/20* | (2017.01) |
| *G05D 1/02* | (2020.01) |
| *G06V 20/58* | (2022.01) |
| *G06V 40/10* | (2022.01) |
| *G06F 18/2113* | (2023.01) |
| *G06F 18/214* | (2023.01) |

(52) U.S. Cl.
CPC ......... *G06V 20/588* (2022.01); *G05D 1/0231* (2013.01); *G05D 1/0276* (2013.01); *G06F 18/2113* (2023.01); *G06T 7/20* (2013.01); *G06V 20/58* (2022.01); *G06V 40/103* (2022.01); *G05D 2201/0213* (2013.01); *G06F 18/2148* (2023.01); *G06T 2207/20081* (2013.01); *G06T 2207/30196* (2013.01); *G06T 2207/30241* (2013.01); *G06T 2207/30261* (2013.01)

(58) Field of Classification Search
CPC .... G06V 20/588; G06V 20/58; G06V 40/103; G05D 1/0231; G05D 1/0276; G05D 2201/0213; G06K 9/623; G06K 9/6257; G06T 7/20; G06T 2207/20081; G06T 2207/30196; G06T 2207/30241; G06T 2207/30261
See application file for complete search history.

(56) References Cited

U.S. PATENT DOCUMENTS

| | | | |
|---|---|---|---|
| 10,242,264 B1 * | 3/2019 | Ten | ...................... G06V 20/588 |
| 10,248,120 B1 | 4/2019 | Siegel et al. | |
| 10,650,278 B1 * | 5/2020 | Ho | .......................... G06V 10/26 |
| 2013/0016915 A1 * | 1/2013 | Hashimoto | .......... G06V 20/588 |
| | | | 382/218 |

(Continued)

FOREIGN PATENT DOCUMENTS

WO    2018098161 A1    5/2018

*Primary Examiner* — Faris S Almatrahi
*Assistant Examiner* — Abdalla A Khaled
(74) *Attorney, Agent, or Firm* — Botos Churchill IP Law

(57) ABSTRACT

Aspects of the disclosure relate to detecting sidewalks adjacent to roads. In this regard, a set of potential sidewalk areas adjacent to one or more roads in a vehicle's vicinity may be determined based on map data. Topology data for the set of potential sidewalk areas may be generated based on sensor data received from a perception system of the vehicle. The set of potential sidewalks may be filtered to remove areas unlikely to include a sidewalk. The vehicle may be operated based on the filtered set of potential sidewalk areas, which may include taking precautionary measures when within a predetermined distance from any of the filtered set of potential sidewalks.

20 Claims, 10 Drawing Sheets

(56) References Cited

U.S. PATENT DOCUMENTS

| | | | |
|---|---|---|---|
| 2015/0165972 A1 | 6/2015 | Takemae et al. | |
| 2015/0228195 A1* | 8/2015 | Beaurepaire | B60Q 1/5035 |
| | | | 340/907 |
| 2016/0046237 A1 | 2/2016 | Sugimoto et al. | |
| 2016/0341558 A1* | 11/2016 | Lee | G01S 19/485 |
| 2017/0337432 A1* | 11/2017 | Maeda | G06V 20/588 |
| 2018/0202821 A1 | 7/2018 | Yu et al. | |
| 2018/0246517 A1 | 8/2018 | Costa et al. | |
| 2018/0326982 A1* | 11/2018 | Paris | B60W 30/18154 |
| 2018/0329418 A1* | 11/2018 | Baalke | B60W 30/0956 |
| 2018/0349715 A1* | 12/2018 | Gupta | G08G 1/0129 |
| 2019/0016316 A1* | 1/2019 | Sung | G08G 1/166 |
| 2019/0031198 A1* | 1/2019 | Aoki | B60W 40/02 |
| 2019/0051150 A1* | 2/2019 | Anderson | G08G 1/07 |
| 2019/0146519 A1* | 5/2019 | Miura | G06V 40/103 |
| | | | 701/28 |
| 2020/0018606 A1* | 1/2020 | Wolcott | G01C 21/3602 |
| 2020/0108826 A1* | 4/2020 | Kim | G08G 1/0104 |
| 2020/0117919 A1* | 4/2020 | Tohriyama | G06T 7/74 |
| 2020/0159231 A1* | 5/2020 | Codevilla | B60W 50/0097 |
| 2020/0298877 A1* | 9/2020 | Takamatsu | G01C 21/3492 |

\* cited by examiner

SIDEWALK DETECTION FOR PEDESTRIAN BEHAVIOR MODELING

CROSS REFERENCE TO RELATED APPLICATIONS

The present application is a continuation of U.S. patent application Ser. No. 16/212,833, filed Dec. 7, 2018, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location. While doing so, safety of passengers, cargo, and the vehicle is an important consideration.

In some instances, human drivers may observe their environment and decide to take precautionary measures when certain features are found in the environment. For example, the human driver may drive slower and farther from the curb when there are sidewalks adjacent to the road, but not take such precautionary measures when there are no sidewalks. Autonomous vehicles also need to take precautionary measures based on certain features found in the vehicle's environment, otherwise, the vehicle may be driving in an overly cautious manner that slows down traffic.

BRIEF SUMMARY

Aspects of the disclosure provides for identifying, by one or more computing devices based on map data corresponding to one or more roads in a vicinity of a vehicle, a set of potential sidewalk areas adjacent to the one or more roads; generating, by the one or more computing devices, topology data for the set of potential sidewalk areas based on sensor data received from a perception system of the vehicle; filtering, by the one or more computing devices, the set of potential sidewalk areas to remove areas unlikely to include a sidewalk; and operating, by the one or more computing devices, the vehicle in an autonomous driving mode based on the filtered set of potential sidewalk areas.

The set of potential sidewalk areas may be areas within a predetermined distance from the one or more roads.

The method may further comprise determining, by the one or more computing devices based on the topology data, one or more clearance widths provided by one or more objects detected within each potential sidewalk area of the set of potential sidewalk areas, wherein the filtering may be based on whether the one or more clearance widths satisfy a threshold clearance width.

The method may further comprise determining, by the one or more computing devices based on the topology data, one or more slopes for each potential sidewalk area of the set of potential sidewalk areas, wherein the filtering may be based on whether the one or more slopes meeting a threshold slope.

The method may further comprise applying, by the one or more computing devices, a morphological filter to the topology data of the set of potential sidewalk areas by using a three dimensional pedestrian model, wherein the filtering may be based on results of the morphological filter.

The method may further comprise determining, by the one or more computing devices base on the sensor data, visual features for each potential sidewalk area of the set of potential sidewalk areas, wherein the filtering may be based on whether each potential sidewalk area of the set of potential sidewalk areas includes visual features corresponding to a material for constructing sidewalks.

The method may further comprise applying, by the one or more computing devices, an image filter to the sensor data of the set of potential sidewalk areas, the image filter including one or more criteria corresponding to visual features of one or more materials for constructing sidewalks, wherein the filtering may be based on the results of the image filter. The image filter may include a color filter. The image filter may include a threshold brightness intensity level. The one or more criteria of the image filter may be adjusted based on an intensity and a color of an ambient light. The one or more criteria of the image filter may be adjusted based on a weather condition.

The method may further comprise determining, by the one or more computing devices, whether one or more remaining areas in the filtered set of potential sidewalk areas form a connected pathway; determining, by the one or more computing devices, whether the connected pathway runs parallel to an adjacent road; categorizing, by the one or more computing devices based on the determination that the connected pathway runs parallel to an adjacent road, the connected pathway as a sidewalk.

Operating the vehicle based on the filtered set of potential sidewalk areas may include controlling the vehicle to drive below a threshold speed when the vehicle is within a predetermined distance from the filtered set of potential sidewalk areas. Operating the vehicle based on the filtered set of potential sidewalk areas may include controlling the vehicle to maintain a threshold clearance distance from the filtered set of potential sidewalk areas.

The method may further comprise using, by the one or more computing devices, the filtered set of potential sidewalk areas as input for a pedestrian behavior model, wherein the pedestrian behavior model may be configured to predict a trajectory of a detected pedestrian based on the filtered set of potential sidewalk areas.

The method may further comprise labeling the filtered set of potential sidewalk areas in a set of sensor data; sending the labeled set of sensor data to a remote server for training a pedestrian behavior model to predict trajectories of detected pedestrians based on locations of sidewalks.

The method may further comprise receiving, by the one or more computing devices, historical data including past detections of pedestrians on the set of potential sidewalk areas, wherein the filtering may be based on the past detections of pedestrians not meeting a threshold number.

The disclosure further provides for a system comprising one or more computing devices configured to identify, based on map data corresponding to one or more roads in a vicinity of a vehicle, a set of potential sidewalk areas adjacent to the one or more roads; generate topology data for the set of potential sidewalk areas based on sensor data received from a perception system of the vehicle; filter the set of potential sidewalk areas to remove areas unlikely to include a sidewalk; and operate the vehicle in an autonomous driving mode based on the filtered set of potential sidewalk areas.

The one or more computing devices may be further configured to apply a morphological filter to the topology data of the set of potential sidewalk areas, the morphological filter using a three dimensional pedestrian model, wherein the filtering may be based on results of the morphological filter.

The one or more computing devices may be further configured to apply an image filter to the sensor data of the set of potential sidewalk areas, the image filter includes one or more criteria corresponding to visual features of one or more materials for constructing sidewalks, wherein the filtering may be based on the results of the image filter.

DETAILED DESCRIPTION

Overview

Figure 1:
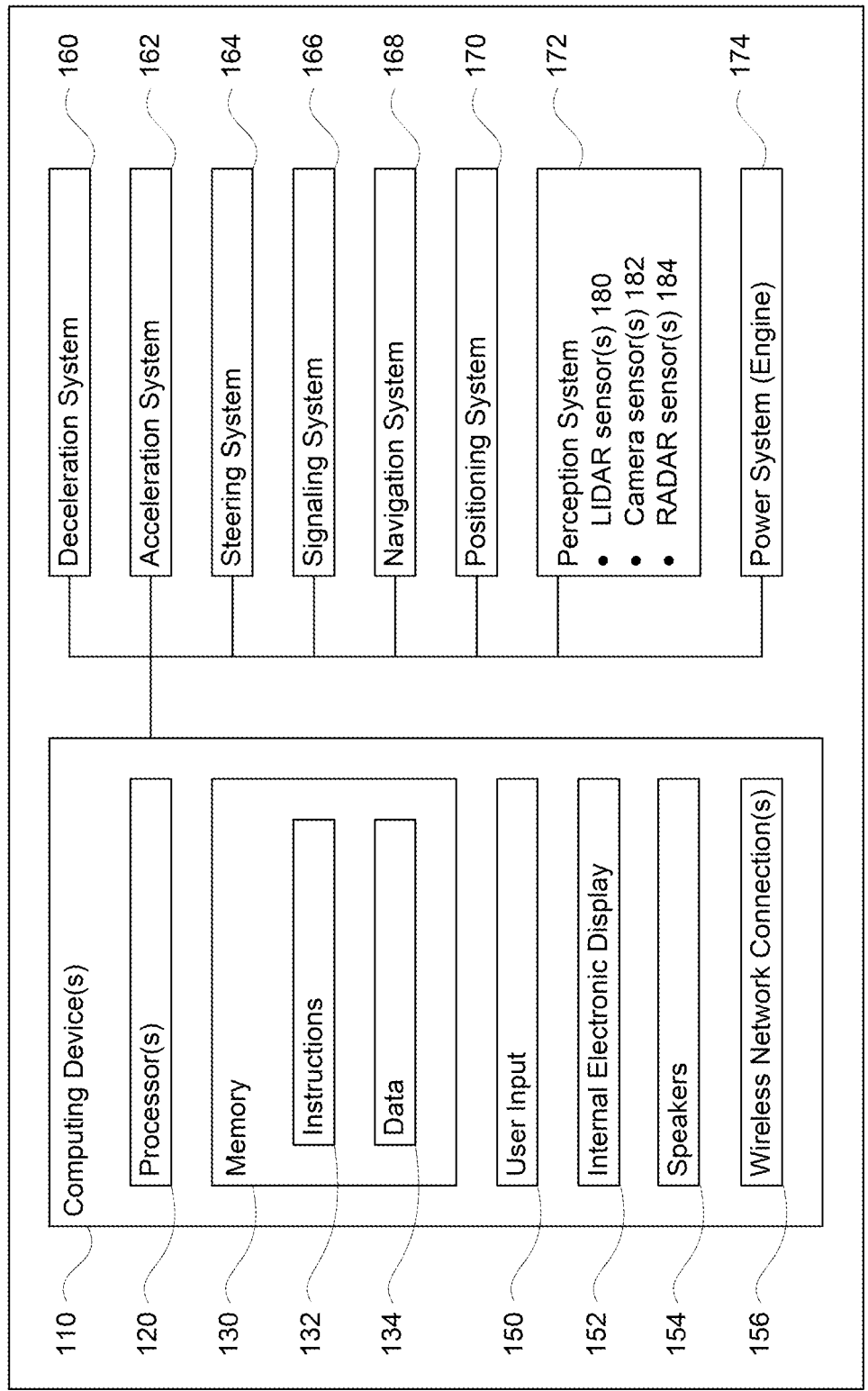
FIG. 1 is a functional diagram of an example vehicle in accordance with an exemplary embodiment.

The technology relates to detecting sidewalks adjacent to roads for autonomous vehicles. Such information may allow autonomous vehicles to then operate in a precautionary state when traveling near sidewalks. A precautionary state may include the autonomous vehicles performing precautionary measures, such as driving more slowly than if a sidewalk was not present or driving farther from the curb on the side of the road where the sidewalk is locates. These precautionary measures may provide the autonomous vehicles with time to make evasive maneuvers in instances where pedestrians and other objects which may be present on the sidewalks may move into the autonomous vehicle's trajectory.

The likelihood of detecting a particular type of road user as well as behaviors of a particular type of road user may depend on the features of the road user's environment. For example, pedestrians may more likely be detected on a sidewalk than on a road. For another example, a pedestrian's trajectory may depend on whether the pedestrian is on a sidewalk. Therefore, determining whether sidewalks exist in the environment of the autonomous vehicles and the location of such sidewalks may be crucial in order for the autonomous vehicles to safely respond to pedestrians.

However, building precise maps of where sidewalks are located relative to roads can be difficult, expensive, and time-consuming. For instance, building such maps may require a human operator to review a large number of images of various roads. Further, the human operator may need to manually label the locations of the sidewalks in the images, which may be labor intensive. Without information indicating whether or not a sidewalk is present adjacent to a road, autonomous vehicles may continuously operate in the precautionary state and thus, in an overly cautious manner, even in areas where no sidewalks are adjacent to roads the autonomous vehicles are travelling. This, in turn, may lead to longer trip times for passengers of the autonomous vehicles and the autonomous vehicles slowing down traffic.

To address these issues, computing devices of an autonomous vehicle may use map data corresponding to the area the vehicle is traveling, and/or sensor data received from sensors of the vehicle's perception system, to identify a set of potential sidewalk areas adjacent to the roads on which the vehicle is traveling. To determine whether any of the set of potential sidewalk areas actually contain sidewalks, the computing devices may analyze sensor data received from the perception system for the potential sidewalk areas.

For instance, the computing devices may use the sensor data to generate topology data for the set of potential sidewalk areas. Based on the topology data of the set of potential sidewalk areas, the computing devices may filter out areas unlikely to include a sidewalk. As one example, a morphological filter may be used to determine whether a pedestrian would be able to pass over a potential sidewalk area of the set of potential sidewalk areas without being blocked by objects.

For another instance, the computing devices may analyze visual features in the sensor data for the set of potential sidewalk areas. Based on the visual features, computing devices may filter out areas unlikely to include a sidewalk. As one example, an image filter may be applied to the sensor data to determine whether a potential sidewalk area of the set of potential sidewalk areas contains visual features consistent with a sidewalk.

The computing devices may then determine whether the remaining areas of the set of potential sidewalk areas form a consistent pathway. In this regard, the remaining areas may be processed through image processing algorithms, such as connected component labeling, to determine whether the remaining form pathways that are generally parallel to one or more roads. The remaining areas which are determined to form a consistent pathway that runs generally parallel to one or more roads may be categorized as sidewalks.

Based on the determination of whether a sidewalk is present, the vehicle may be operated in the precautionary state when the vehicle is within a predetermined distance of a sidewalk. In addition, the determination of whether a sidewalk is present may be used to adjust behavior modeling of road users in the vicinity of the sidewalk, including pedestrians and other vehicles.

The features described above may allow for autonomous vehicles to operate in a normal operating state even in instances where no sidewalk map data is available. As such, the autonomous vehicle may be able to avoid operating in an overly cautious manner. Accordingly, trip times may be reduced and the autonomous vehicle may minimize its effects on traffic. In addition, by determining where crosswalks are present, the autonomous vehicle may be more capable of yielding to pedestrians at locations where the pedestrians have the right of way. Further, behavior models of road users may be improved by using the determined sidewalk information, such as when predicting pedestrian trajectories that follow sidewalks and crosswalks.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing devices 110 via a high-bandwidth or other network connection. In some examples, this computing device may be a user interface computing device which can communicate with a user's client device. Similarly, the memory may be a hard drive or other storage media located in a housing different from that of computing devices 110. Accordingly, references to a processor or computing device will be understood to include references to a collection of processors or computing devices or memories that may or may not operate in parallel.

Computing devices 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be an autonomous driving computing system incorporated into vehicle 100. The autonomous driving computing system may capable of communicating with various components of the vehicle. For example, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a drop-off location completely autonomously using data from the map data and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store map data, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map data may store known traffic or congestion information and/or and transit schedules (train, bus, etc.) from a particular pickup location at similar times in the past. This information may even be updated in real time by information received by the computing devices 110.

Figure 2:
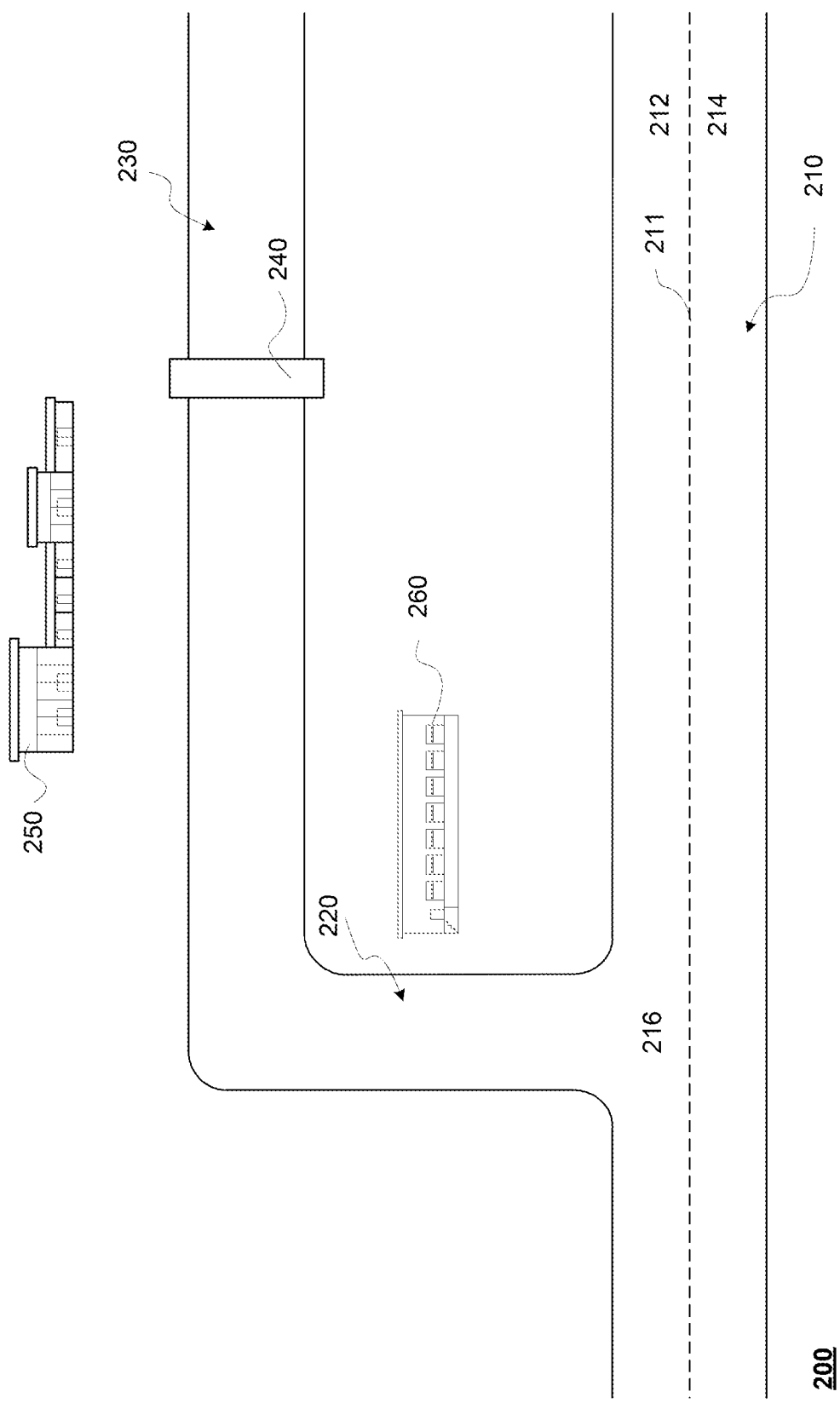
FIG. 2 is an example representation of map data in accordance with aspects of the disclosure.

FIG. 2 is an example of map data 200. As shown, the map data 200 includes the shape, location, and other characteristics of road 210, road 220, and road 230. Map data 200 may include the shape, location (e.g. GPS coordinates), and other characteristics of lane markers or lane lines, such as lane line 211 for road 210. The lane lines may also define various lanes, for example lane line 211 defines lanes 212, 214 of road 210. As alternative to lane lines or markers, lanes may also be inferred by the width of a road, such as for roads 220 and 230. The map data 200 may also include information that identifies the direction of traffic and speed limits for each lane as well as information that allows the computing devices 110 to determine whether the vehicle has the right of way to complete a particular type of maneuver (i.e. complete a turn, cross a lane of traffic or intersection, etc.). Map data 200 may also include relationship information between the roads, such as roads 210, 220, and 230. For example, map data 200 may indicate that road 210 intersects road 220 at intersection 216, and that road 220 and road 230 are connected at an angle.

In some examples, map data 200 may further include zoning information. For instance, the zoning information may be obtained from administrative records, such as county records. As such, information on the roads may include indication that it is within a residential zone, a school zone, a commercial zone, etc.

In addition, map data 200 may include the shape, location, and other characteristics of various buildings or structures (such as points of interests) and the type of these buildings or structures. As shown, map data 200 depicts bridge 240 across road 230, building 250 on road 230, and building 260 on road 210. Map data 200 may include the type of the buildings 250 and 260, such as an airport, train station, stadium, school, church, hospital, apartment building, house, etc. In this regard, the type of the building 250 may be collected from administrative records, such as county records, or manually labeled by a human operator after reviewing aerial images.

Map data 200 may further include the shape, location, and other characteristics of signs and markings on the roads with various characteristics and different semantic meanings, such as traffic lights, stop signs, pedestrian crossings, etc. Map data 200 may additionally include other features such as curbs, waterways, vegetation, etc.

Although the detailed map data is depicted herein as an image-based map, the map data need not be entirely image based (for example, raster). For example, the detailed map data may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensor(s) 180, camera sensor(s) 182, and RADAR sensor(s) 184. The perception system 172 may include other sensors, such as SONAR device(s), gyroscope(s), accelerometer(s), and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
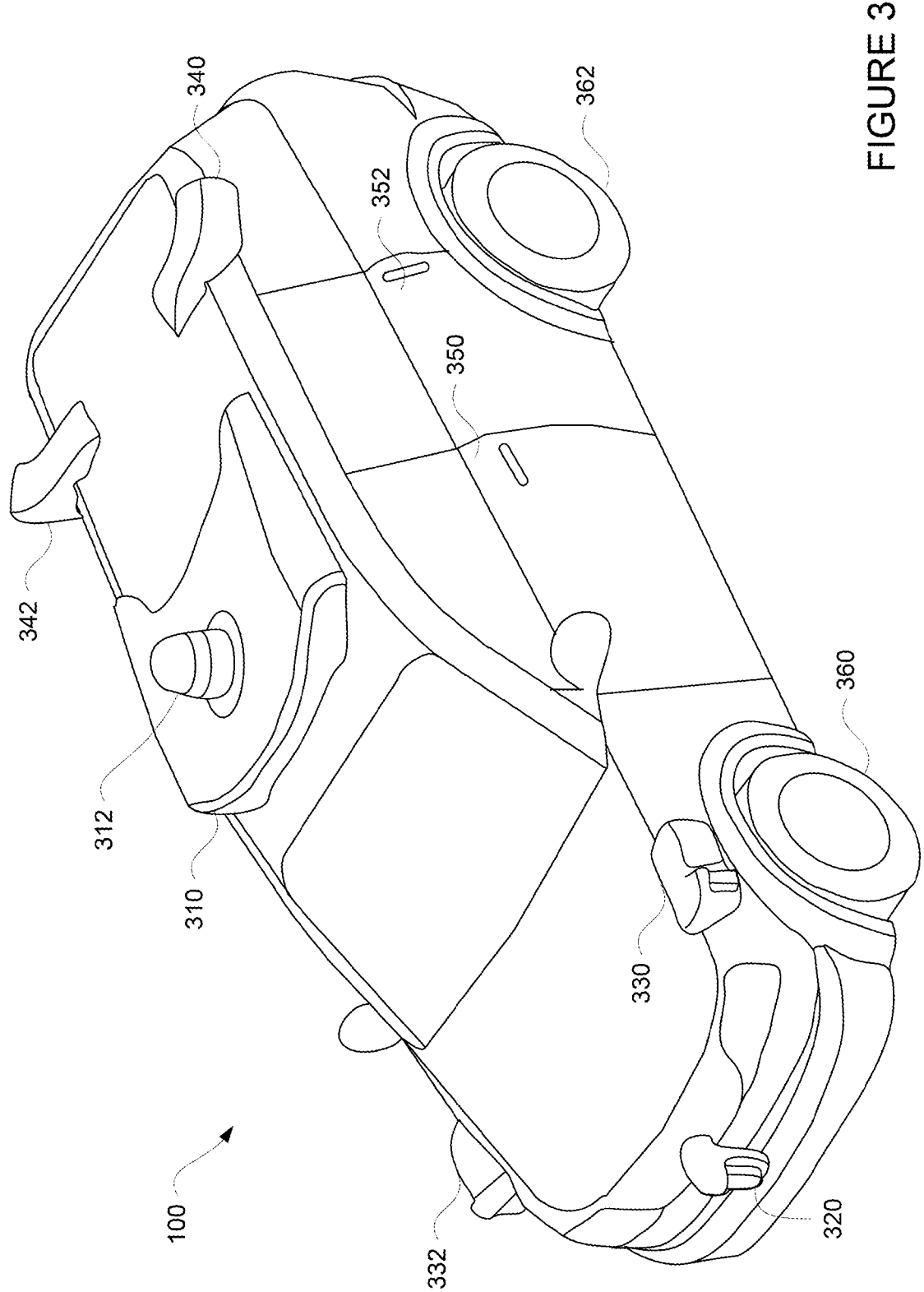
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and RADAR units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for RADAR units and/or cameras also located on the roof of vehicle 100. Additional RADAR units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Memory 130 may store various models used by computing device 110 to make determinations on how to control vehicle 100. For example, memory 130 may store one or more object recognition models for identifying road users and objects detected from sensor data. For another example, memory 130 may store one or more behavior models for predicting a detected road user's behaviors. In one aspect, computing devices 110 may have a model for each type of road user. For example, computing devices 110 may have a pedestrian behavior model for predicting pedestrian trajectories.

Computing devices 110 may also store various values, such as thresholds and ranges in memory 130. For example, computing devices 110 may store a threshold minimum width required for a sidewalk. For another example, computing devices 110 may store dimensions of an average person. For yet another example, computing devices 110 may store value ranges and/or thresholds for visual features associated with various materials, such as cement, asphalt, dirt, etc., which may include ranges of color, brightness intensity, textural patterns, etc. For still another example, computing devices 110 may store historical data on past detections of pedestrians, such as values indicating how many pedestrians were detected and the locations of the past detections. As described in detail below with respect to the example methods, these values may be used to filter out potential sidewalk areas that do not actually contain sidewalks.

Figure 4:
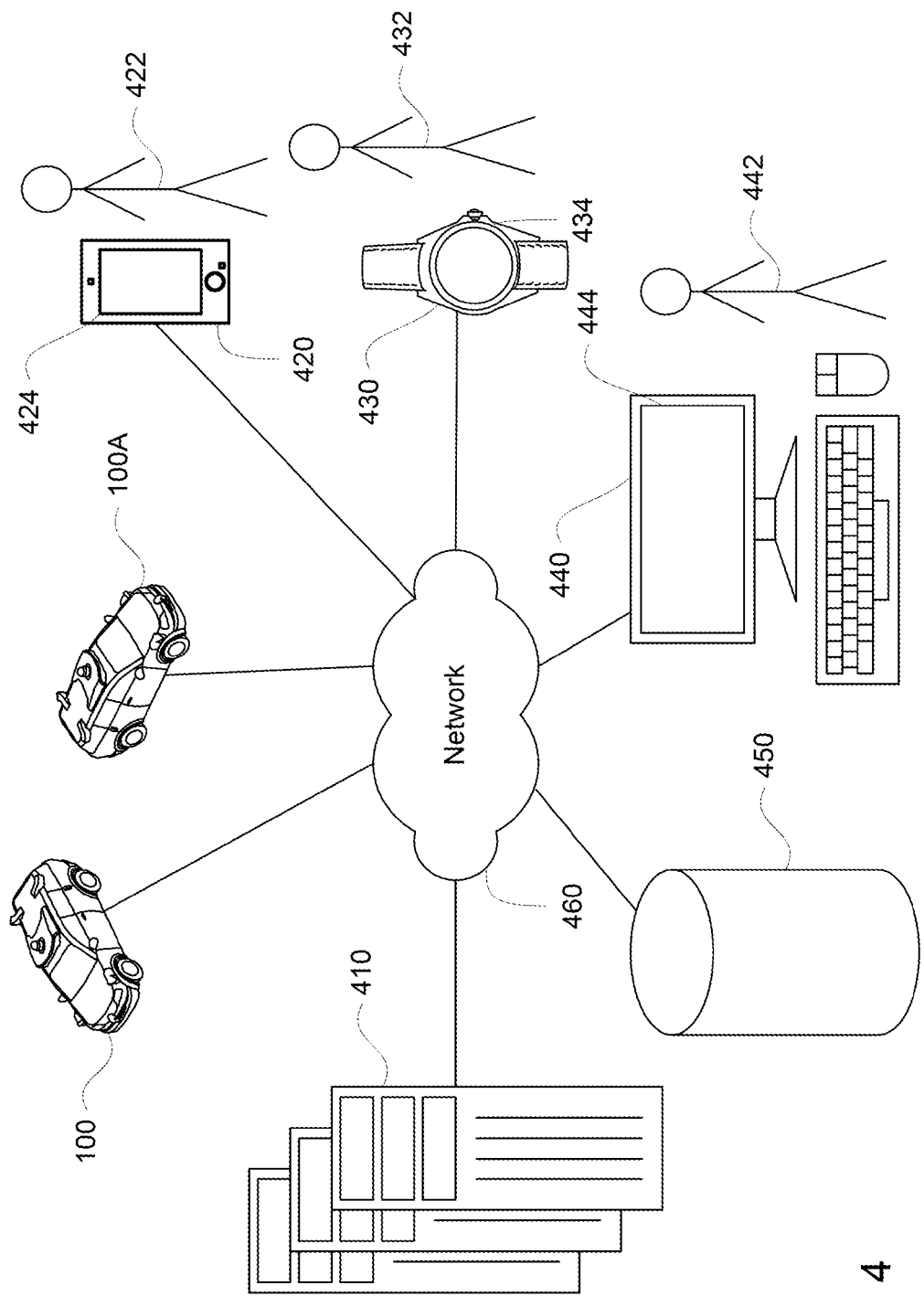
FIG. 4 is an example pictorial diagram of a system in accordance with aspects of the disclosure.
Figure 5:
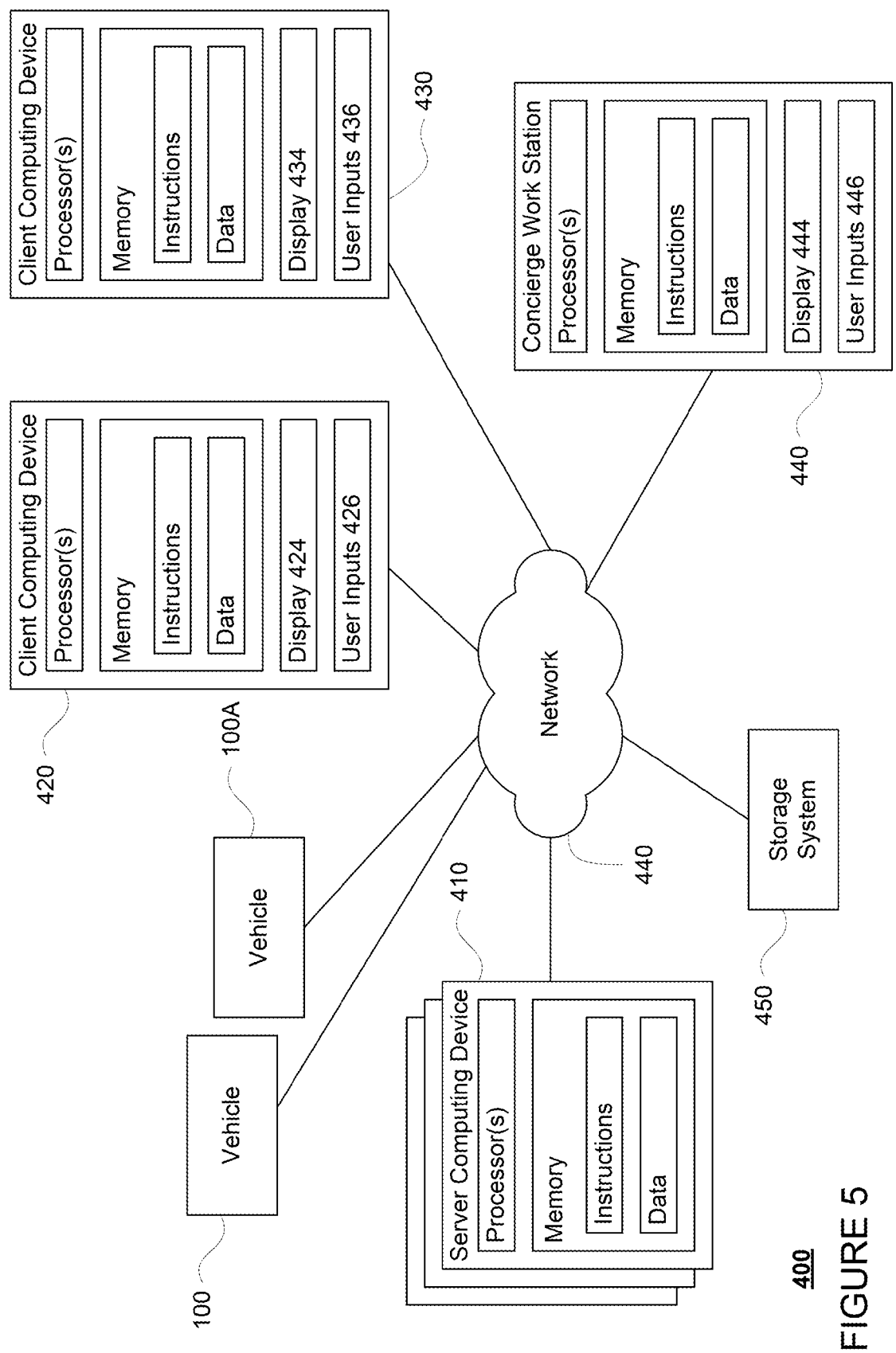
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

Server computing device 410 may store various data. For example, values such as the thresholds and ranges described above may be stored on server computing device 410. For another example, models such as object recognition models and behavior models may be stored on server computing device 410.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). A user, such as user 422, 432, 442, may send information, such as pickup or drop-off requests, to server computing devices 410, using user input devices 426, 436, 446 of computing devices 420, 430, 440. The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as age information, health information, and user history information about how long it has taken the user to enter or exit vehicles in the past as discussed below.

The storage system 450 may also store routing data for generating and evaluating routes between locations. For example, the routing information may be used to estimate how long it would take a vehicle at a first location to reach a second location. In this regard, the routing information may include map data, not necessarily as particular as the detailed map data 200 described above, but including roads, as well as information about those road such as direction (one way, two way, etc.), orientation (North, South, etc.), speed limits, as well as traffic information identifying expected traffic conditions, etc.

The storage system 450 may additionally store values such as the thresholds and ranges described above. For another example, models such as behavior models and object detection models may also be stored on server computing device 410.

The storage system 450 may also store information which can be provided to client computing devices for display to a user. For instance, the storage system 450 may store predetermined distance information for determining an area at which a vehicle is likely to stop for a given pickup or drop-off location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted.

In one aspect, computing devices 110 may maneuver vehicle 100 towards a destination location. In order to do so, computing devices 110 may calculate a route using the map data 200 and navigation system 168. Computing devices 110 may then control vehicle 100 to follow the calculated route. While following the route, computing devices 110 may detect various road users and other objects using sensor data from perception system 172. Computing devices 110 may predict behaviors of the detected road users in order to control vehicle 100 to safely respond to these detected road users.

For instance, once a nearby object is detected by the perception system 172, computing devices 110 and/or perception system 172 may determine the object's type, for example, a building, a fence, a traffic barrier, a tree, a pedestrian, a vehicle (such as a passenger car, truck, bus, etc.), a bicycle, etc. Objects may be identified by various characteristics of the detected objects, such as the size and shape of an object, the color and brightness of the object, the speed of the object (bicycles do not tend to go faster than 40 miles per hour or slower than 0.1 miles per hour), the heat coming from the object (bicycles tend to have rider that emit heat from their bodies), etc. In addition, the object may be classified based on specific attributes of the object, such as information contained on a license plate, bumper sticker, or logos that appear on the vehicle. As described in detail below with respect to the example methods, these sensor data may be used to determine topology data for a potential sidewalk area.

Figure 6:
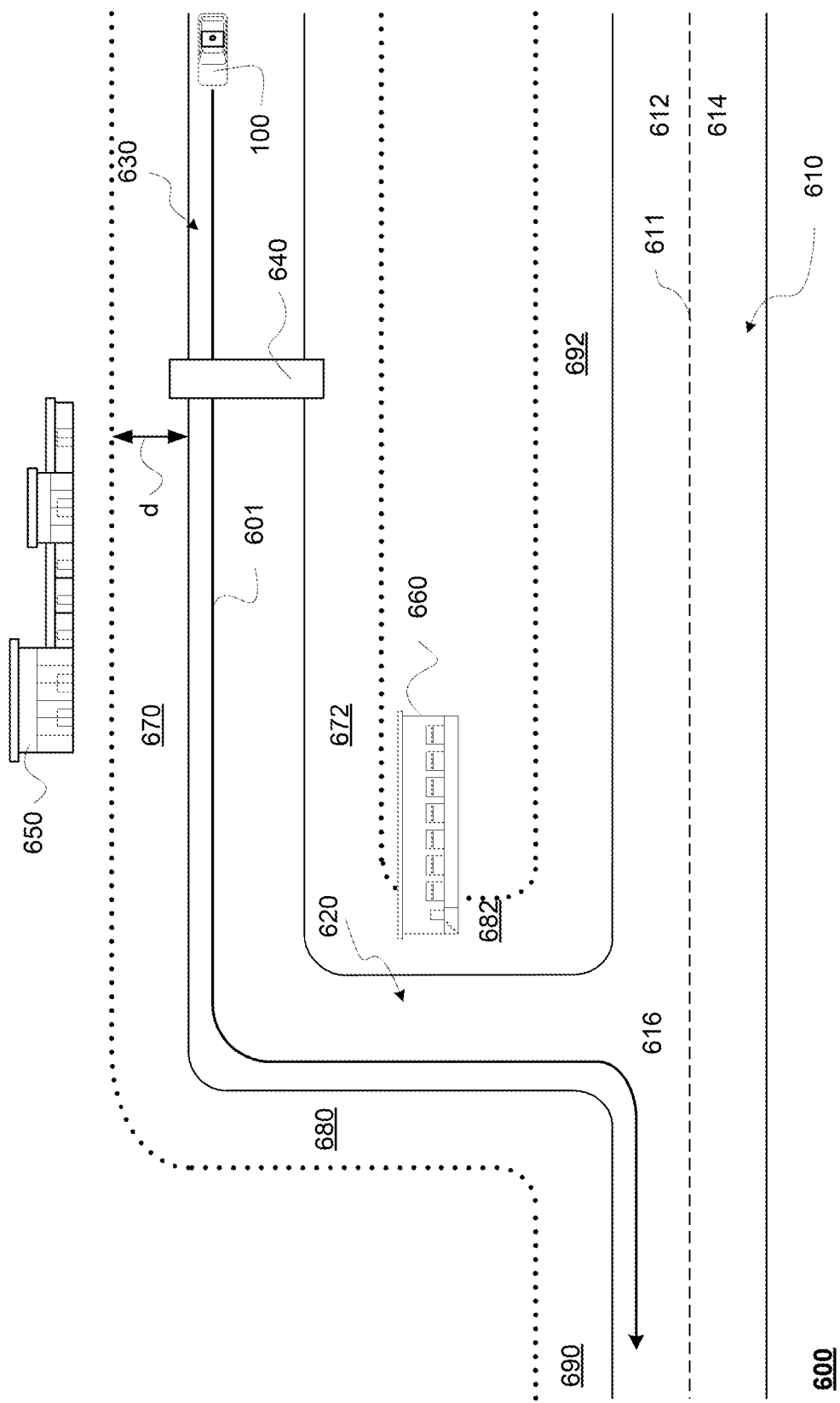
FIG. 6 is an example situation for identifying a set of potential sidewalk areas in accordance with aspects of the disclosure.

FIG. 6 illustrates an example situation 600 for identifying a set of potential sidewalk areas in the vicinity of vehicle 100. Various features in FIG. 6 may generally correspond to the shape, location, and other characteristics of features shown in map data 200 of FIG. 2, and labeled as such. For example, road 610 may correspond to road 210, road 620 may correspond to road 220, road 630 may correspond to road 230. For another example, bridge 640 may correspond to bridge 240, building 650 may correspond to building 250, and building 660 may correspond to building 260. For yet another example, intersection 616 may correspond to intersection 216. For still another example, lane line 611 may correspond to lane 211, lane 612 may correspond to lane 212, lane 614 may correspond to lane 214. Additional features in FIG. 6, including various road users and other objects, are described in detail below. Although these examples are useful for demonstration purposes, they should not be considered limiting. As shown in FIG. 6, vehicle 100 is currently driving on road 630 and following a calculated route 601, to ensure safe operation, computing devices 110 may determine a set of potential sidewalk areas in which pedestrians are likely to be found. For instance, computing devices 110 may receive locations, such as GPS coordinates of roads in the vicinity of vehicle 100, such as roads 630, 620, 610.

While maneuvering the vehicle 100, the computing devices 110 may use sensor data received from sensors of the vehicle's perception system, as well as map data corresponding to the area the vehicle is traveling, to identify a set of potential sidewalk areas adjacent to the roads on which the vehicle is traveling. For instance, based on the locations of the roads, computing devices may identify areas within a predetermined distance adjacent to the roads as the set of potential sidewalk areas. This predetermined distance may be, for instance 10 feet or more or less, beyond drivable road surfaces of the road, or some other distance likely to include sidewalk areas. For example, as shown in FIG. 6, computing devices 110 may identify based on map data 200 potential sidewalk areas 670 and 672 are adjacent to road 630, potential sidewalk areas 680 and 682 are adjacent to road 620, and potential sidewalk areas 690 and 692 are adjacent to road 610. Further as shown in FIG. 6, each of the potential sidewalk areas 670, 672, 680, 682, 690, 692 may have a width of d (such as 10 feet or more or less).

The computing devices 110 may also identify the set of potential sidewalk areas based on sensor data received from perception system 172, such as LIDAR point clouds from one or more LIDAR sensors and/or camera images from one or more cameras. For instance, while driving on road 630, computing devices 110 may determine the locations of the edges or curbs of road 630 from camera images, and then identify areas within a predetermined distance (e.g., 10 feet, or more or less) adjacent to both sides of road 630 as the set of potential sidewalk areas. For another instance, while driving on road 630, computing devices 110 may determine the locations of the edges or curbs of road 630 from LIDAR point clouds, and then identify areas within a predetermined distance (e.g., 10 feet, or more or less) adjacent to both sides of road 630 as the set of potential sidewalk areas.

However, not all areas adjacent to roads contain sidewalks. Further, some sidewalks may not currently be available, such as ones under construction. As mentioned above, assuming all areas adjacent to roads contain sidewalks may result in controlling vehicle 100 in an overly cautious manner, leading to longer trip times and traffic slowdowns.

As such, in order to determine which of the set of potential sidewalk areas adjacent to roads actually include sidewalks, computing devices 110 may analyze sensor data collected on the set of potential sidewalk areas. The set of potential sidewalk areas may then be filtered to remove areas unlikely to include a sidewalk using various techniques as discussed further below. These techniques may be used alone or in any combination in order to better identify sidewalk areas.

Figure 7A:
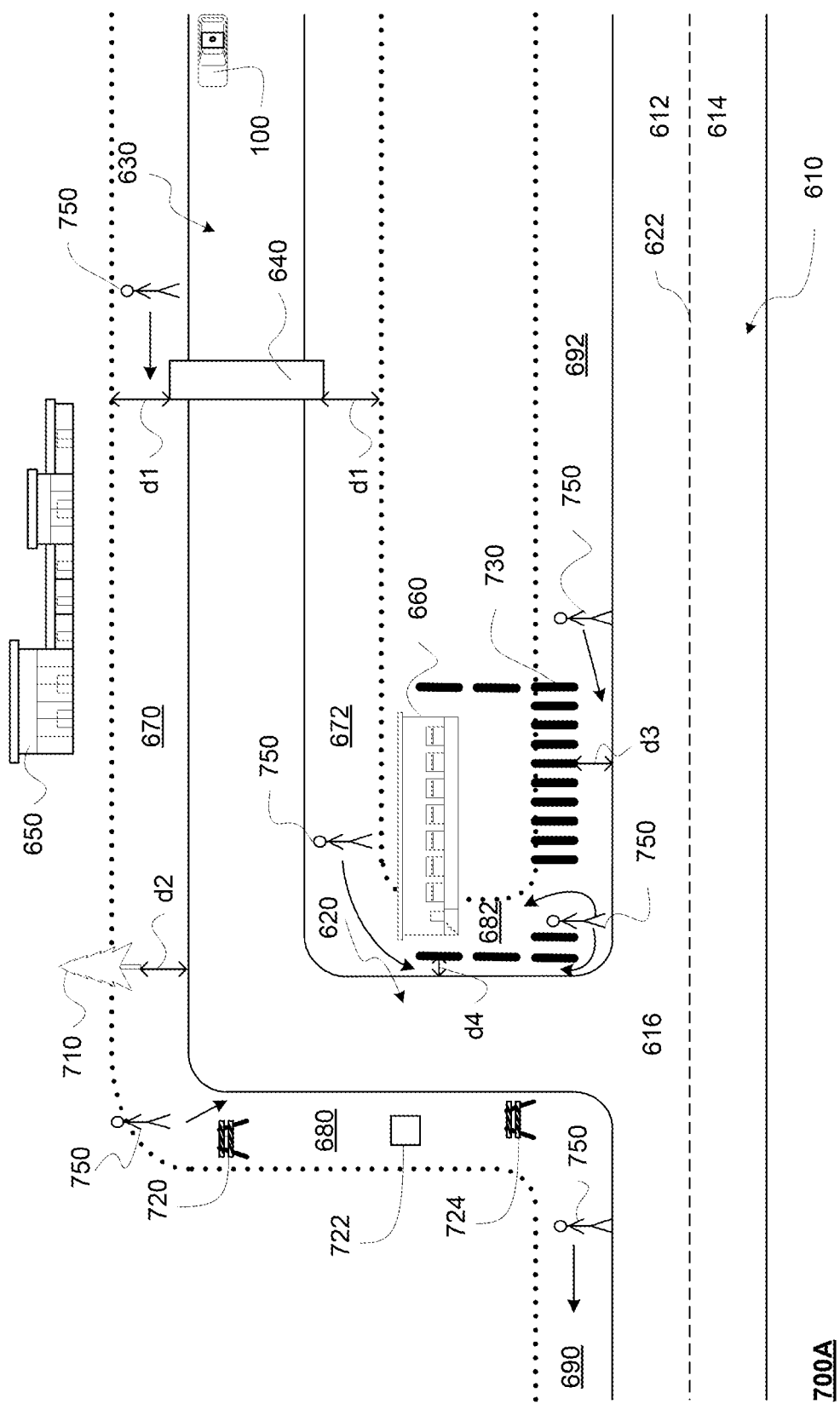
FIGS. 7A and 7B are example situations for filtering the set of potential sidewalk areas in accordance with aspects of the disclosure.

FIG. 7A illustrates an example situation 700A for filtering the set of potential sidewalk areas in the vicinity of vehicle 100. Various features in FIG. 7A may generally correspond to the shape, location, and other characteristics of features shown in situation 600 of FIG. 6, and labeled as such. Additional features in FIG. 7A, including various road users and other objects, are described in detail below. Although these examples are useful for demonstration purposes, these examples should not be considered limiting.

As shown in FIG. 7A, as vehicle 100 drives along roads 630, 620, and 610, vehicle 100 may receive sensor data from perception system 172 on various objects, such as vegetation, buildings, road structures, etc. Further as shown, some of the objects are detected to be entirely in a potential sidewalk area, such as barriers 720 and 724, and pothole 722 in the potential sidewalk area 680. Other objects are detected to be partially in a potential sidewalk area, such as bridge 640 in the potential sidewalk areas 610 and 612, vegetation 710 in the potential sidewalk area 670, building 660 in the potential sidewalk area 682, and fence 730 in the potential sidewalk areas 682 and 692. Computing devices 110 may analyze the sensor data for each of the set of potential sidewalk areas 670, 672, 680, 682, 690, 692, including sensor data on the detected objects or portions thereof in the set of potential sidewalk areas, to determine whether any of the set of potential sidewalk areas contain sidewalks.

Computing devices 110 may generate topology data for each potential sidewalk area of the set of potential sidewalk areas based on the received sensor data, and analyze the topology data to filter out areas unlikely to include a sidewalk. For instance, computing devices 110 may virtually overlay LIDAR point clouds and/or camera images with map data 200 to generate three dimensional (3D) topology data for a potential sidewalk area. For instance, the sensor data may be compared to map data 200 based on relative locations of the road and vehicle 100, or by matching features detected by sensor data with locations of the features in map data 200, such as matching a detected edge of a road in sensor data to a location of the edge of the road in map data 200. For example as shown in FIG. 7A, 3D topology data for each potential sidewalk area of the set of potential sidewalk areas 670, 672, 680, 682, 690, 692 may include shapes and dimensions of objects (or portions thereof) detected within the respective potential sidewalk area, such as portions of bridge 640, vegetation 710, barriers 720 and 724, pothole 722, fence 730, and building 660. Further, 3D topology data for each potential sidewalk area of the set of potential sidewalk areas 670, 672, 680, 682, 690, 692 may further include contours of the ground level within each respective potential sidewalk area.

Based on the topology data, the set of potential sidewalk areas may be filtered by the computing devices 110 in order to eliminate any areas that are unlikely to include a sidewalk. As one instance, computing devices 110 may determine whether any detected objects in the potential sidewalk areas are large enough, or positioned such that a pedestrian would be unable to pass within the potential sidewalk area. As an example, potential sidewalk areas which, given any of the detected objects, do not provide at least a threshold clearance width of 2 feet or more or less in the potential sidewalk area, through which a pedestrian may pass through may be filtered as being unlikely to include a sidewalk. For example, as shown in FIG. 7A, bridge 640 may provide a clearance width of 8 feet (shown as d1) in both potential sidewalk area 670 and potential sidewalk area 672, and vegetation 710 may provide a clearance width of 6 feet (shown as d2) in potential sidewalk area 670. As such, computing devices 110 may not filter out potential sidewalk areas 670 and 672 based on clearance widths. For another example, fence 730 may provide a clearance width of 4 feet (shown as d3) in potential sidewalk area 692, but a clearance width of only 1 feet (shown as d4) in potential sidewalk area 682. As such, computing devices 110 may filter out potential sidewalk area 682 as unlikely to include a sidewalk based on insufficient clearance width, while may not filter out potential sidewalk area 692 based on clearance width. For yet another example, barriers 720 and 724 may each provide a clearance width of 4 feet, and pothole 722 may provide a clearance width of 3 feet on either side, as such, computing devices 110 may not filter out potential sidewalk area 680 based on clearance width.

Additionally or alternatively, the computing devices 110 may use a morphological filter to determine whether a pedestrian would be able to pass through potential sidewalk areas without being blocked by objects. If not, the potential sidewalk area may be filtered. A morphological filter is an image processing filter that applies any of a number of morphological operators, such as erosion, dilation, opening, and closing to an image in order to filter the image by shape or morphology of objects captured in the image. For example, the morphological filter may transform the topology data of the potential sidewalk areas and a three dimensional pedestrian model into characterizations such as shape, convexity, connectivity, and geodesic distances. Alternatively or additionally, the morphological filter may be a machine learning model, such as a neural network model. The machine learning model may be trained using sensor data on potential sidewalk areas labeled with whether a pedestrian model may be able to pass. For example as shown in FIG. 7A, the pedestrian model 750 may be a 3D shape of an average human. Alternatively, the pedestrian model 750 may be a 3D box, such as a rectangular box that is 2 feet in width and length, and 6 feet in height.

Using the morphological filter may include "moving" the pedestrian model 750 along various positions of the potential sidewalk areas in order to filter out areas that have insufficient space for the pedestrian model 750 to pass through. For example as shown in FIG. 7A, computing devices 110 may use the morphological filter to move pedestrian model 750 along potential sidewalk area 670, sliding past one side of bridge 640 and vegetation 710, and filter out areas in the potential sidewalk area 670 occupied by bridge 640 and vegetation 710 from the potential sidewalk area 670. Computing devices 110 may then use the morphological filter to move pedestrian model 750 along potential sidewalk area 680, sliding past one side of barrier 720, one side of pothole 722, and one side of barrier 724, and filter out areas in the potential sidewalk area 680 occupied by barrier 720, pothole 722, and barrier 724 from the potential sidewalk area 680.

For another example, computing devices 110 may use the morphological filter to move pedestrian model 750 along potential sidewalk area 672, past other side of bridge 640, and filter out the area in the potential sidewalk area 672 occupied by bridge 640. Computing devices 110 may then use the morphological filter to continue moving pedestrian model 750, but may not be able to move into potential sidewalk area 682 due to building 660 and fence 730. As such, computing devices 110 may filter out the areas in the potential sidewalk area 682 occupied by fence 730 and building 660 from the potential sidewalk area 682. Further, since the pedestrian model 750 cannot pass through the filtered potential sidewalk area 682, computing devices 110 may filter out the entire potential sidewalk area 682 as unlikely to include a sidewalk.

For still another example, computing devices 110 may use the morphological filter to move pedestrian model 750 along potential sidewalk area 692, sliding past one side of fence 730, and filter out the area in the potential sidewalk area 692 occupied by fence 730 from the potential sidewalk area 692.

By using a 3D model of a human, the morphological filter may take into account various dimensions of the detected objects and the set of potential sidewalk areas. For example, even if vegetation 710 may have branches and leaves that do not provide a clearance width of 2 feet, the branches and leaves may have a height above the height of pedestrian model 750, such as 10 feet. As such, computing devices 110 may use the morphological filter to determine that the pedestrian model 750 may slide past vegetation 710. Therefore, in such a case computing devices 110 may not filter out the areas occupied by vegetation 710 from potential sidewalk area 670 using the morphological filter.

The morphological filter may include additional details in the pedestrian model in order to provide better filtering based on human physiology. For instance, the morphological filter may further include a threshold height for a detected object that the pedestrian model 750 may not consider as a significant obstacle, such as 1 feet. For example, the morphological filter may determine that vegetation 710 is only 0.5 feet in height, and may simply slide pedestrian model 750 through vegetation 710 as opposed to around vegetation 710, since the pedestrian model 750 may simply step over the vegetation 710. For another instance, the morphological filter may further include a threshold slope that the pedestrian model 750 may consider as uncomfortably steep. For example, even if clearance width is sufficient in potential sidewalk area 692, the morphological filter may determine that the ground level in potential sidewalk area 692 has a slope meeting a threshold slope too steep for pedestrian model 750, and filter out the entire potential sidewalk area 692 as unlikely to include a sidewalk.

In another aspect, computing devices 110 may determine visual features of the set of potential sidewalk areas based on the sensor data, and analyze the visual features to filter out areas in the set of potential sidewalk areas as unlikely to include a sidewalk. For instance, sidewalks may be constructed from various materials, such as white cement, gray cement, asphalt, dirt, etc., each of which may have different visual features including different color, brightness, reflectivity, textual patterns, etc. Such visual features may be captured by sensor data, such as camera images captured by one or more cameras of the perception system 172. Computing devices 110 may analyze the sensor data for visual features associated with one or more sidewalk materials, and filter out areas in the set of potential sidewalk area that do not contain such visual features.

In this regard, filtering by visual features may be performed after filtering by topology data. For example as discussed above, after filtering out areas in the set of potential sidewalk areas 670, 672, 680, 682, 690, 692 based on topology data, the remaining areas in the potential sidewalk areas 670, 680, 690, and 672 (since potential sidewalk areas 682 and 692 were filtered out entirely) may be further filtered based on visual features. In other examples, filtering by visual features may be performed before filtering based on topology data. In still other examples, filtering by visual features and by topology data may be performed simultaneously.

The computing devices 110 may also use an image filter in order to filter the set of potential sidewalk areas. The image filter may be configured to determine whether sensor data for a potential sidewalk area contains visual features consistent with various criteria, such as color, brightness, reflectivity, textual patterns, etc., and filter out areas from the potential sidewalk area that do not contain such visual features. For instance, the image filter may include a color filter and a threshold brightness intensity level. For example, referring to FIG. 7A, computing devices 110 may use the image filter to determine that the remaining area of the potential sidewalk area 670 contains areas that have the color white and a brightness intensity level satisfying the threshold brightness intensity level, but also areas that do not have the color white and/or a brightness intensity level satisfying the threshold brightness intensity level. As such, computing devices 110 may filter out the areas that do not have the color white and/or a brightness intensity level satisfying the threshold brightness intensity level from the remaining area of the potential sidewalk area 670 as unlikely to include a sidewalk. For another example, computing devices 110 may use the image filter to determine that the remaining area in the potential sidewalk area 690 does not contain any area that have the color white and/or a brightness intensity level satisfying the threshold brightness intensity level. As such, computing devices 110 may filter out the entire remaining area of the potential sidewalk area 690 as unlikely to include a sidewalk.

Criteria of the image filter may be determined to account for variations in visual features indicative of a sidewalk. For instance, materials used for sidewalks may vary from location to location, and hence visual features consistent with a sidewalk may vary from location to location. As such, various criteria of the image filter may include more than one possible values in order to account for these variations. For example, the image filter may include multiple color filters, such as a gray filter corresponding to gray cement, and a brown color filter corresponding to dirt, etc. Further, the image filter may include multiple threshold brightness intensity levels corresponding to each type of sidewalk material, such as grey cement and dirt, etc. For example, referring to FIG. 7A, computing devices 110 may use the image filter to determine that the remaining area of the potential sidewalk area 672 contains areas that have the color gray and a brightness intensity level satisfying the threshold brightness intensity level for gray cement, but also areas that do not have the color gray and/or a brightness intensity level satisfying the threshold brightness intensity level for gray cement. As such, computing devices 110 may filter out the areas that do not have the color gray and/or a brightness intensity level satisfying the threshold brightness intensity level for gray cement from the remaining area of the potential sidewalk area 672 as unlikely to include a sidewalk. For another example, computing devices 110 may use the image filter to determine that the entire remaining area of the potential sidewalk area 680 contains the color brown and satisfies the threshold brightness intensity level for dirt, and therefore does not filter out any of the remaining area of the potential sidewalk area 680. For still another example, computing devices 110 may use the image filter to determine that the remaining area of the potential sidewalk area 690 does not contain any area having the colors white, gray, or brown corresponding to various sidewalk materials, and thus filter out the entire remaining area of the potential sidewalk area 690 as unlikely to include a sidewalk.

Criteria of the image filter may be adjusted by the computing devices 110 in order to account for variations in visual features caused by external conditions. For instance, values for various criteria of the image filter may be adjusted based on time of day and/or weather conditions. For example, visual features such as color and brightness intensity of a material may change based on an intensity and color of the ambient light reflecting off the material. For instance, the color and brightness intensity of a material may change depending on whether the material is under sunlight, moonlight, neon light, etc., and the intensity and/or color of the ambient light. As such, computing devices 110 may set the color filter and/or threshold brightness intensity level of the image filter with default values for an ambient light with a predetermined intensity and color, and adjust the default values based on changes in the ambient light. For another example, visual features such as color and brightness intensity of a material may be different depending on whether the material is dry or wet. For instance, computing devices 110 may set the color filter as white when the weather condition is dry and adjust the color filter to gray when the weather condition is rainy.

Instead of adjusting the criteria of the image filter, additional filters reflecting the external conditions may be used. For example, a nighttime image filter may be applied on top of a daytime image filter when vehicle 100 is driving at night, where the nighttime image filter may include color and/or brightness intensity values that can be added to the values of the daytime image filter. For another example, a rainy image filter may be applied on top of the daytime image filter when vehicle 100 is driving in rain, where the rainy image filter may include color and/or brightness intensity values that can be added to the values of the daytime image filter. As such, computing devices 110 may determine the external conditions, and select a combination of image filters accordingly.

Figure 7B:
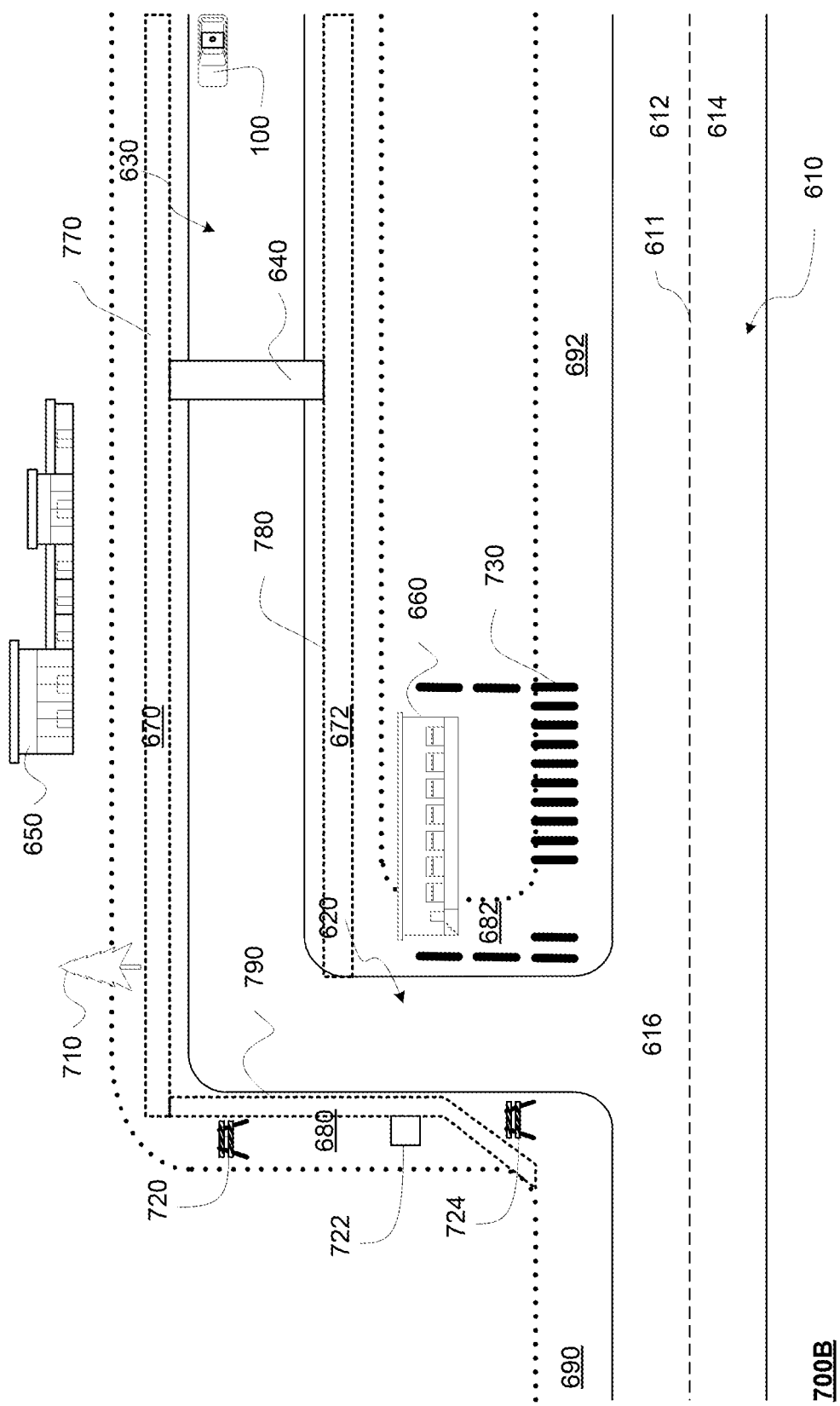

Once the set of potential sidewalk areas is filtered to eliminate areas that are unlikely to include a sidewalk, computing devices 110 may then determine whether the remaining areas of the filtered set of potential sidewalk areas form a consistent pathway. In this regard, the remaining areas of the filtered set of potential sidewalk areas may be processed through image processing algorithms which determine whether the remaining areas of the filtered set of potential sidewalk areas form pathways that are generally parallel to one or more roads. FIG. 7B illustrates an example situation 700B for determining pathways in the filtered set of potential sidewalk areas. Various features in FIG. 7B may generally correspond to the shape, location, and other characteristics of features shown in situation 700A of FIG. 7A, and labeled as such. Additional features in FIG. 7B, including various road users and other objects, are described in detail below. Although these examples are useful for demonstration purposes, they should not be considered limiting.

After filtering the set of potential sidewalk areas based on topology data and/or visual features as described above, computing devices 110 may further determine whether the remaining areas in the filtered set of potential sidewalk areas form connected pathways that are consistent with being a sidewalk. For instance, referring to FIG. 7B, having entirely filtered out potential sidewalk areas 682 and 692 based on topology data, having entirely filtered out potential sidewalk area 690 based on visual features, as well as having partially filtered out some areas of potential sidewalk areas 670, 680, and 672 based on topology data and visual features, computing devices 110 may determine whether the remaining areas of the potential sidewalk areas 670, 680, and 672 form pathways that are generally parallel to an adjacent road. Computing devices 110 may categorize the connected pathways generally parallel to an adjacent road as being sidewalks.

For instance, computing devices 110 may use image processing algorithms, such as connected component labeling, to find one or more connected pathways in the sensor data for the remaining areas of the potential sidewalk area 670. Alternatively or additionally, a machine learning model, such as a neural network model, may be trained to determine connected pathways in the remaining areas of the set of potential sidewalk areas. For example, the machine learning model may be trained using sensor data of potential sidewalk areas labeled with connected pathways. For example, connected pathway 770 may be found in the LIDAR data or camera images for the remaining areas of potential sidewalk area 670. Further as shown, since pathway 770 is generally parallel to road 630, computing devices may determine that the remaining areas of the potential sidewalk area 670 may include a sidewalk. Additionally, computing devices 110 may categorize pathway 770 as a sidewalk. Likewise, computing devices 110 may determine that the remaining areas of the potential sidewalk area 672 includes a connected pathway 780 that is also generally parallel to road 630, and therefore determine that the remaining areas of the potential sidewalk area 672 may also include a sidewalk. Further, computing devices 110 may categorize pathway 780 as a sidewalk. However, as shown, using connected component labeling, computing devices 110 may determine that the remaining areas of the potential sidewalk area 680 includes a connected pathway 790 that is not generally parallel to adjacent road 620. As such, computing devices 110 may determine that potential sidewalk area 680 is unlikely to include a sidewalk, and categorize connected pathway 790 as not being a sidewalk.

Additionally or alternatively, computing devices 110 may determine whether the set of potential sidewalk areas include a sidewalk based on historical data. The historical data may include past detections of pedestrians in the set of potential sidewalk areas. For instance, computing devices 110 may filter areas from the set of potential sidewalk areas based on the historical data. For example, computing devices 110 may filter areas of the set of potential sidewalk areas without any historical data of detected pedestrians as unlikely to include a sidewalk. For another example, computing devices 110 may filter out areas of the set of potential sidewalk areas with historical data of detected pedestrians not meeting a threshold number as unlikely to include a sidewalk. Filtering by historical data may be performed before, after, or simultaneously with any of the filters described above were applied, such as the morphological and image filters.

For another instance, after filtering the set of potential sidewalk areas and determining the connected pathways, the connected pathways may be analyzed based on historical data. For example, computing devices 110 may categorize connected pathways with historical data of detected pedestrians as a sidewalk, and categorize connected pathways with no historical data of detected pedestrians as not a sidewalk. For another example, computing devices 110 may categorize connected pathways with historical data of detected pedestrians meeting a threshold number as a sidewalk, and categorize connected pathways with historical data of detected pedestrians not meeting the threshold number as not a sidewalk.

The computing devices 110 may then use the determination of whether a sidewalk is present to control the vehicle 100. In this regard, based on the determination that a sidewalk is present, computing devices 110 may operate vehicle 100 in a precautionary state when vehicle 100 is in the vicinity of the sidewalk. For instance, computing devices 110 may control vehicle 100 to enter the precautionary state upon detecting the sidewalk within a predetermined distance of vehicle 100. A precautionary state may include the autonomous vehicles performing precautionary measures, which may include limits on speed and acceleration, and maintaining a minimum clearance distance, etc. For example, while driving on road 630, computing devices 110 may control vehicle 100 to drive at a speed at or below a threshold speed within a predetermined distance of potential sidewalk area 670, which was determined to contain pathway 770, which was categorized as a sidewalk. For another example, computing devices 110 may control vehicle 100 to maintain a distance at or above a threshold clearance distance from potential sidewalk area 670. Such precautionary measures may provide the vehicle 100 with time to make evasive maneuvers in instances where pedestrians present on pathway 770, which was categorized as a sidewalk, may move into a trajectory of vehicle 100.

Conversely, based on the determination that a sidewalk is not present, computing devices 110 may prevent vehicle 100 from unnecessarily operating in the precautionary state. For example, while driving in lane 612 of road 610, computing devices 110 may control vehicle 100 to drive at a speed within its normal limits, such as posted speed limits of road 610, since computing devices 110 may determine that, due to an absence of sidewalks adjacent to lane 612 of road 610, pedestrians are less likely to be found adjacent lane 612 or move into lane 612.

In some instances, computing devices 110 may use the determination of whether a sidewalk is present to predict behaviors of pedestrians and other road users. For instance, determination of whether a sidewalks is or is not present may be inputted into behavior models as additional information, based on which behavior predictions may be made. For example, determination that pathway 770, which was categorized as a sidewalk, is present adjacent to road 630 may be used as input to a pedestrian behavior model, the pedestrian behavior model may then predict a trajectory of a pedestrian detected adjacent to road 630 as one that tracks the sidewalk. For another example, determination that a sidewalk is not present adjacent to lane 612 of road 610 may be used as input to a vehicle behavior model, the vehicle behavior model may then predict trajectories of vehicles as being closer to the curb than if a sidewalk were present.

Additionally or alternatively, determinations of whether sidewalks are present may be used as training data to train behavior models to more accurately predict trajectories. For instance, referring to FIGS. 4 and 5, computing devices 110 may send sensor data labeled with whether a sidewalk is determined to be present and/or location of such sidewalks to server computing device 410 or storage system 450. Server computing device 410 may then access the labeled sensor data to train one or more behavior models stored on the server computing device 410. For example, a pedestrian behavior model may be trained with sensor data labeled with whether a sidewalk was determined to be present, to learn patterns such as pedestrians are likely to follow a trajectory that tracks the shape of a sidewalk. For another example, a vehicle behavior model may be trained with sensor data labeled with whether a sidewalk was determined to be present, to learn patterns such as that vehicles are likely to follow a slower trajectory when driving adjacent to a sidewalk.

Alternatively or additionally, the behavior models may be trained to predict trajectories based on the historical data of past pedestrian detections. For example, the pedestrian behavior model may be trained with sensor data for a set of potential sidewalk areas and historical data of past pedestrian detections on the set of potential sidewalk areas, the sensor data and/or the historical data may be labeled with whether a sidewalk is present. Further, the historical data may additionally include past detections of pedestrian movements, such as past trajectories of the detected pedestrians. For example, the pedestrian behavior model may be trained with sensor data for as set of potential sidewalk areas, and historical data of pedestrian movements labeled with trajectories that follow sidewalks.

Additionally or alternatively, using the labeled sensor data, server computing device 410 may update map data 200 with sidewalk information in the labeled sensor data. Once updated, the updated map data 200 may be downloaded to memory 130 of computing devices 110 or otherwise made accessible (such as via network 440) to computing devices 110 for use onboard vehicle 100 in future trips.

Figure 8:
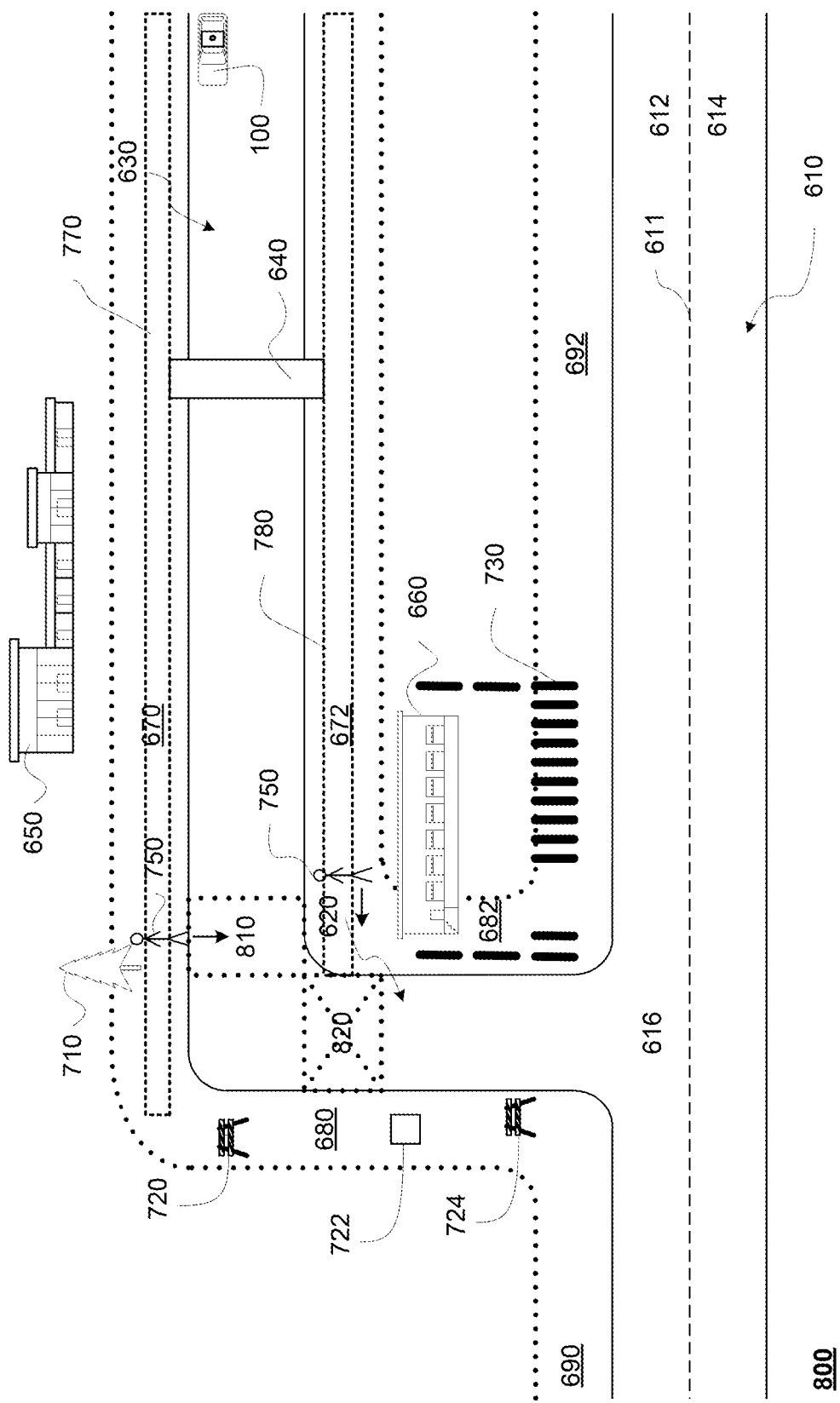
FIG. 8 is an example situation for determining crosswalk areas in accordance with aspects of the disclosure.

In some instances, additional crosswalks may also be inferred by the computing devices 110 by analyzing the positioning of the categorized sidewalks relative to one another. FIG. 8 illustrates an example situation 800 for determining crosswalks. Various features in FIG. 8 may generally correspond to the shape, location, and other characteristics of features shown in situation 700B of FIG. 7B, and labeled as such. Additional features in FIG. 8, including various road users and other objects, are described in detail below. Although these examples are useful for demonstration purposes, they should not be considered limiting.

Referring to FIG. 8, once pathways in potential sidewalk areas are categorized as sidewalks, computing devices 110 may further determine whether one or more crosswalks can be inferred based on the location of these categorized sidewalks. In this regard, computing devices 110 may determine whether one categorized sidewalk may be connected to one or more other categorized sidewalks across a road. For example as shown, computing devices 110 may determine that pathway 770, which was categorized as a sidewalk, can be connected across road 630 to pathway 780, which was also categorized as a sidewalk. Further as shown, computing devices 110 may determine that a crosswalk may more likely be at an intersection of two or more roads, rather than in the middle of a road, and determine that crosswalk 810 may connect pathway 770 to an end of pathway 780 where road 630 intersects road 620.

Additionally or alternatively, computing devices 110 may determine whether a crosswalk exists using a morphological filter. For example, computing devices 110 may use the morphological filter with pedestrian model 750 as described above. For example, computing devices 110 may determine whether pedestrian model 750 may cross from one categorized sidewalk on one side of a road to another categorized sidewalk on another side of the road, at a 90 degree angle to the direction of the road, or more or less. For instance as shown in FIG. 8, a crosswalk 810 may be inferred where pedestrian model 750 may cross from pathway 770, which was categorized as a sidewalk, to pathway 780, which was also categorized as a sidewalk, at a 90 degree angle to the direction of road 630, or more or less. For another instance as shown in FIG. 8, a crosswalk 820 may not be inferred where pedestrian model 750 cannot cross from pathway 770, which was categorized as a sidewalk, to any other sidewalk at a 90 degree angle to the direction of road 620, or more or less.

Based on the inferred crosswalks, computing devices 110 may operate vehicle 100 in a precautionary state when vehicle 100 is in the vicinity of the crosswalk. For example, the precautionary state may include similar precautionary measures as described above relating to driving adjacent to sidewalks, such as limits on speed, acceleration, and maintaining a minimum clearance distance. Conversely, based on the determination that a crosswalk is not present at or near an intersection, computing devices 110 may prevent vehicle 100 from unnecessarily operating in the precautionary state.

Additionally or alternatively, determinations of crosswalks may be used as input and/or training data for behavior models. For instance, referring to FIGS. 4 and 5, computing devices 110 may send sensor data labeled with whether a crosswalk is determined to be present and/or location of such crosswalks to server computing device 410 or storage system 450. Server computing device 410 may then access the labeled sensor data to train one or more behavior models stored on the server computing device 410. For example, this may include using determination of crosswalks as input to a pedestrian behavior model to predict where a pedestrian is likely to cross a road. For another example, a pedestrian behavior model may be trained with sensor data labeled with whether a crosswalk was determined to be present, to learn patterns such as a trajectory of a pedestrian crossing from one sidewalk to another sidewalk.

Additionally or alternatively, using the labeled sensor data, server computing device 410 may update map data 200 with crosswalk information in the labeled sensor data. Once updated, the updated map data 200 may be downloaded to memory 130 of computing device 110 or otherwise made accessible (such as via network 440) to computing devices 110 for use onboard vehicle 100 in future trips.

Figure 9:
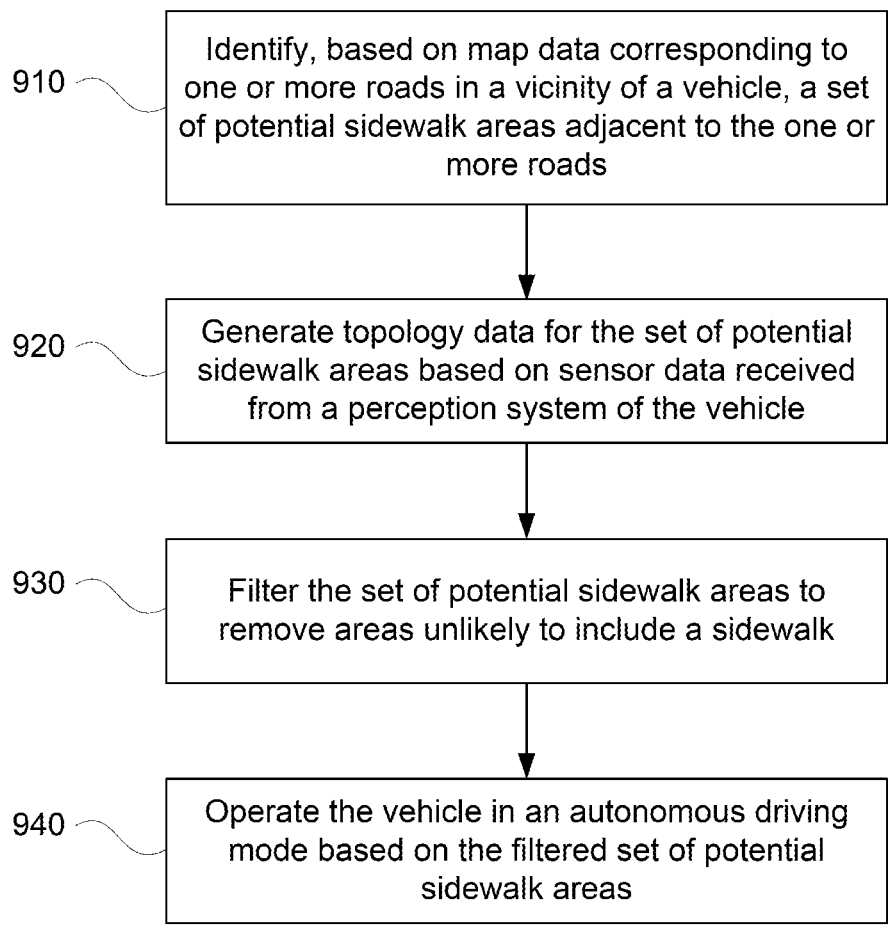
FIG. 9 is an example flow diagram in accordance with aspects of the disclosure.

FIG. 9 is a flow diagram 900 of an example method for determining sidewalks adjacent to roads. For example, computing devices 110 may perform the method shown in flow diagram 900. In block 910, based on map data corresponding to one or more roads in a vicinity of a vehicle, a set of potential sidewalk areas adjacent to the one or more roads are identified. For example, referring to FIG. 6, a set of potential sidewalk areas 670, 680, 690, 672, 682, 692 may be determined adjacent to roads 610, 620, and 630.

In block 920, topology data for the set of potential sidewalk areas are generated based on sensor data received from a perception system of the vehicle. For example, referring to FIG. 7A, topology data may be generated including three dimensional shapes of objects detected in potential sidewalk areas 670, 680, 690, 672, 682, 692.

In block 930, the set of potential sidewalk areas are filtered to remove areas unlikely to include a sidewalk. For instance, the potential sidewalk areas may be filtered based on topology data, such as using a morphological filter as shown in FIG. 7A. Additionally or alternatively, the potential sidewalk areas may be filtered based on visual features, such as using an image filter as described above with respect to FIG. 7A.

In block 940, the vehicle is operated in an autonomous driving mode based on the filtered set of potential sidewalk areas. For instance, the vehicle may be operated to take precautionary measures when within a predetermined distance from the filtered set of potential sidewalk areas. For example, precautionary measures may include limits on speed and acceleration, and maintaining a clearance distance from the filtered potential sidewalk areas.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising: receiving, by one or more computing devices, sensor data identifying a plurality of potential sidewalk areas; filtering, by the one or more computing devices, the sensor data based on at least one of clearance width, slope or obstructions associated with each of the potential sidewalk areas to eliminate areas of the plurality of potential sidewalk areas that are unlikely to include a sidewalk; identifying, by the one or more computing devices, a plurality of pathways in the filtered potential sidewalk areas that are adjacent to a road in a vicinity of an autonomous vehicle; categorizing as a first sidewalk, by the one or more computing devices, a first pathway of the plurality of identified pathways adjacent to a first side of the road; categorizing as a second sidewalk, by the one or more computing devices, a second pathway of the plurality of identified pathways adjacent to a second side of the road; determining, by the one or more computing devices, results indicating whether a crosswalk exists between the first and second pathways of identified pathways; and operating, by the one or more computing devices, the autonomous vehicle based on the results.

2. The method of claim 1, wherein the crosswalk allows one or more pedestrians to cross the road at a 90 degree angle to a direction of the road.

3. The method of claim 2, wherein the crosswalk is located at an intersection of two or more roads.

4. The method of claim 2, wherein the crosswalk connects the first pathway to an end of the second pathway.

5. The method of claim 1, wherein operating the autonomous vehicle includes operating the autonomous vehicle in a precautionary state when driving adjacent to a sidewalk.

6. The method of claim 5, wherein the precautionary state includes limiting the autonomous vehicle to drive at a speed equal to or below a threshold speed.

7. The method of claim 1, further comprising: sending, by the one or more computing devices, sensor data to a server computing device; and accessing, by the one or more computing devices, map data that was updated with crosswalk information based on the sensor data.

8. Apparatus comprising: one or more computing devices coupled configured to: receive sensor data identifying a plurality of potential sidewalk areas; filter the sensor data based on at least one of clearance width, slope or obstructions associated with each of the potential sidewalk areas to eliminate areas of the plurality of potential sidewalk areas that are unlikely to include a sidewalk; identify a plurality of pathways in the filtered potential sidewalk areas that are adjacent to a road in a vicinity of an autonomous vehicle; categorize as a first sidewalk, a first pathway of the identified plurality of pathways adjacent to a first side of the road; categorize as a second sidewalk a second pathway of the plurality of identified pathways adjacent to a second side of the road; determine results indicating whether a crosswalk exists between the first and second pathways of the plurality of identified pathways; and operate the autonomous vehicle based on the results.

9. The apparatus of claim 8, wherein the crosswalk allows one or more pedestrians to cross the road at a 90 degree angle to a direction of the road.

10. The apparatus of claim 9, wherein the crosswalk is located at an intersection of two or more roads.

11. The apparatus of claim 9, wherein the crosswalk connects the first pathway to an end of the second pathway.

12. The apparatus of claim 8, wherein the one or more computing devices are further configured to operate the autonomous vehicle in a precautionary state when driving adjacent to a sidewalk.

13. The apparatus of claim 12, wherein the precautionary state includes limits the autonomous vehicle to drive at a speed equal to or below a threshold speed.

14. The apparatus of claim 8, wherein the apparatus is included by the autonomous vehicle.

15. The method of claim 1, wherein when driving on the road, the autonomous vehicle maintains at least a minimum clearance distance from a potential sidewalk area that includes a pathway categorized as a sidewalk.

16. The method of claim 1, wherein the filtering comprises: generating, by the one or more computing devices, topology data for the potential sidewalk areas, wherein the sensor data is filtered based on the topology data.

17. The method of claim 1, wherein the sensor data is received from a perception system of the autonomous vehicle.

18. The apparatus of claim 8, wherein when driving on the road, the autonomous vehicle maintains at least a minimum clearance distance from a potential sidewalk area that includes a pathway categorized as a sidewalk.

19. The apparatus of claim 8, wherein the one or more computing devices are further configured to generate topology data for the potential sidewalk areas, wherein the sensor data is filtered based on the topology data.

20. The apparatus of claim 8, wherein the sensor data is received from a perception system of the autonomous vehicle.

* * * * *

UNITED STATES PATENT AND TRADEMARK OFFICE
CERTIFICATE OF CORRECTION

PATENT NO. : 11,887,380 B1
APPLICATION NO. : 17/144209
DATED : January 30, 2024
INVENTOR(S) : Jared Stephen Russell It is certified that error appears in the above-identified patent and that said Letters Patent is hereby corrected as shown below:

In the Claims

Claim 1, Column 22, Lines 57 and 58:
Now reads: "between the first and second pathways of identified pathways;" should read -- between the first and second pathways of the plurality of identified pathways; --

Claim 8, Column 23, Lines 13 and 14:
Now reads: "one or more computing devices coupled configured to:" should read -- one or more computing devices configured to: --

Signed and Sealed this
Fifth Day of March, 2024

Katherine Kelly Vidal
*Director of the United States Patent and Trademark Office*